United States Patent [19]
Hapke et al.

[11] Patent Number: 5,682,772
[45] Date of Patent: Nov. 4, 1997

[54] LID SWITCH WITH CONTACT FAILURE DETECTION

[75] Inventors: Kenyon A. Hapke, Libertyville, Ill.; Spencer C. Schantz, Dousman; David M. Howie, Waukesha, both of Wis.

[73] Assignee: U.S. Controls Corporation, New Berlin, Wis.

[21] Appl. No.: 605,569

[22] Filed: Feb. 29, 1996

Related U.S. Application Data

[63] Continuation-in-part of Ser. No. 425,760, Apr. 20, 1995, Pat. No. 5,600,976, and Ser. No. 569,467, Dec. 8, 1995.

[51] Int. Cl.⁶ .................................................... B08B 3/02
[52] U.S. Cl. .......................... 68/12.26; 134/57 DL; 200/61.7
[58] Field of Search ............. 134/58 DL; 68/12.02, 68/12.26; 242/61.7; 292/201, DIG. 69

[56] References Cited

U.S. PATENT DOCUMENTS

| | | |
|---|---|---|
| 3,569,646 | 3/1971 | Smith . |
| 4,510,777 | 4/1985 | Ellingson et al. ............. 134/57 DL |
| 4,623,179 | 11/1986 | Davis et al. ..................... 68/12.26 |
| 4,645,886 | 2/1987 | Williams . |
| 4,951,693 | 8/1990 | Archambault .................. 134/57 DL |
| 4,995,650 | 2/1991 | Schantz et al. .................. 68/12.26 |
| 5,001,910 | 3/1991 | Harmelink et al. .............. 68/12 R |
| 5,038,587 | 8/1991 | Harmelink ...................... 68/12.26 |
| 5,600,976 | 2/1997 | Hapke et al. .................... 68/12.26 |

*Primary Examiner*—Frankie L. Stinson
*Attorney, Agent, or Firm*—Quarles & Brady

[57] ABSTRACT

A switch for a washing machine lid or the like detects welded load contact through an auxiliary set of contacts which shunt the load when the first set of contacts should be open and thus provide a high-current path when those contacts are welded. A series fusible link mechanically activates a set of disconnect contacts which disconnects the washing machine motor. The resulting switch has a single operator that may be collapsible to be self-adjusting permitting the switch to snap in place without the need for a separate adjustment step in the manufacturing process.

21 Claims, 7 Drawing Sheets

LID SWITCH WITH CONTACT FAILURE DETECTION

This application is a continuation-in-part of application Ser. No. 08/425,760 filed Apr. 20, 1995 now U.S. Pat. No. 3,600,976 entitled Washing Machine Lid Switch Assembly and a continuation-in-part of U.S. application Ser. No. 08/425,760 filed Dec. 8, 1995 entitled Self-Adjusting Lid Switch still pending.

FIELD OF THE INVENTION

The present invention relates to clothes washing machines and the like, and specifically to a switch for stopping a clothes washing machine when the lid is raised.

BACKGROUND OF THE INVENTION

During the spin cycle of the washing machine, when water is removed from wet clothes centrifugally by spinning the clothes in a spin basket, it is important that the washing machine lid remains closed to prevent injury to the user. For this reason, the lid is normally connected to an electrical switch which controls a mechanism to stop the motion of the spin basket when the lid is raised.

For reasons of manufacturing convenience, it may be desirable to place the lid switch near the lid hinge. At this position, however, there is very little motion of the lid when the lid is opened. As a result, the lid switch must be carefully adjusted during manufacturing to ensure that the spin basket is stopped before the lid is opened too far. This adjustment may be accomplished, for example, by mounting the lid switch to a slide adjustment bracket, which is manually located and tightened into position with one or more screws. This adjustment process increases the cost of manufacturing the washing machine and creates the potential for future misadjustment if the screws become loosened.

The lid switch typically controls current to the washing machine motor. When the lid is opened, large inductive currents from the motor can cause a pitting and arcing across the switch contacts, removing contact material, and ultimately causing the contacts to weld together. If the contacts become welded together, the washing machine will no longer stop when the lid is raised, and the user is exposed to possible injury.

It is known in the art to detect such contact failure by means of a lid switch incorporating two distinct switches and a fuse. The first switch is actuated with a small opening of the lid and serves to interrupt current to the washing machine motor and to stop the spin basket. The second switch is actuated with a greater opening of the lid. This second switch is electrically connected so that if the contacts of the first switch are welded together, a current is drawn through the second switch and the fuse. This current causes the fuse to blow disconnecting power from an ancillary component of the washing machine, such as a water inlet valve. The disabling of this component in subsequent wash cycles, signals the user that service of the washing machine is needed.

In this design, the fuse is normally in series with the disabled component. For this reason, the component must be of relatively low power to ensure (1) that the fuse will not blow during normal operation and (2) the fuse can be blown with safe currents passing through the second set of contacts. As a practical matter this means that the motor of the washing machine may not be disabled by this circuit and thus can still operate with the lid raised and thereby pose a risk to the user.

SUMMARY OF THE INVENTION

The present invention provides a self-adjusting lid switch with contact failure detection. The self adjustment is obtained by a collapsing cam follower between the lid and switch. This self-adjustment permits the lid switch to be snapped into place on the washing machine without further adjustment during the manufacturing process. Contact failure detection is provided by a fusible link that is not in series within the washing machine motor and thus may have a low current rating. A blowing of this fusible link (such as occurs if the load contacts weld together) physically opens a separate disconnect contact preventing current flow to the entire washing machine including the motor, fully disabling the washing machine until the lid switch can be replaced.

Specifically, the present invention provides a switch assembly having an operator movable between first and second position. The operator controls a load contact pair which, during normal operation, permits current flow to the load only when the operator is in the second position. During a contact failure, however, the load contact pair also permits current flow to the load in the first position. An auxiliary contact pair, also connected to the operator, shunts the load when the operator is in the first position and is in series with a fusible link. A disconnect contact pair is placed in electrical series with the load contact pair and held closed by the fusible link only when the fusible link is not broken.

Thus, it is one object of the invention to provide a lid switch that fully deactivates the washing machine when the load contact pair fails. Because the current path to the load is broken by the disconnect contacts, not the fusible link, the amount of current controlled is not limited by the rating of the fusible link. An arbitrarily large load may be disconnected.

It is another object of the invention to eliminate failure of the washing machine caused by accidental blowing of the fuse during normal peaks in current demand. In the present invention, the fuse is normally not conducting and hence cannot blow during normal operation.

The fusible link may be of conductive plastic material.

It is thus another object of the invention to provide a fusible link that may be incorporated directly into the confines of a closed switch assembly. The conductive plastic, when subjected to current, either melts and elongates opening the main contacts or vaporizes to relatively high resistance carbon ash without spraying conductive molten particles across live conductors as might occur with a metallic fuse element. The plastic material can be injection molded into a relatively large component that may be easily handled during manufacture.

The switch of the present invention may include a stop limiting the motion of the operator after the second position is reached and the operator may be connected to the lid of a washing machine through a collapsible joint. The collapsible joint may comprise a first and second sliding shell having interengaging teeth flexing out of engagement with a predetermined threshold compressive force along the collapsible joint. Alternatively, the collapsible joint may be a first and second sliding shell each supporting one of ratchet teeth and pawl, the pawl including a pylon abutting a stop to disengage the pawl from the ratchet teeth when the operator has moved a predetermined threshold distance.

It is thus another object of the invention to provide a switch having multiple sets of contacts for detecting contact failure and that is fully self-adjusting. Because it is self-adjusting, the switch, despite its multiple sets of contacts and multiple switching thresholds, may be installed into a washing machine or the like with snap-type fastening eliminating subsequent time consuming adjustment. A first closing of the lid causes collapse of the collapsible joint after the operator reaches the stop point. A subsequent opening of the lid causes the operator to move to the first position before the lid is opened a predetermined amount.

The foregoing and other objects and advantages of the invention will appear from the following description. In this description, reference is made to the accompanying drawings which form a part hereof and in which there is shown by way of illustration the preferred embodiment of the invention. Such embodiment does not necessarily represent the full scope of the invention, however, and reference must be made therefore to the claims for interpreting the scope of the invention.

DETAILED DESCRIPTION OF THE PREFERRED EMBODIMENTS

Figure 1:
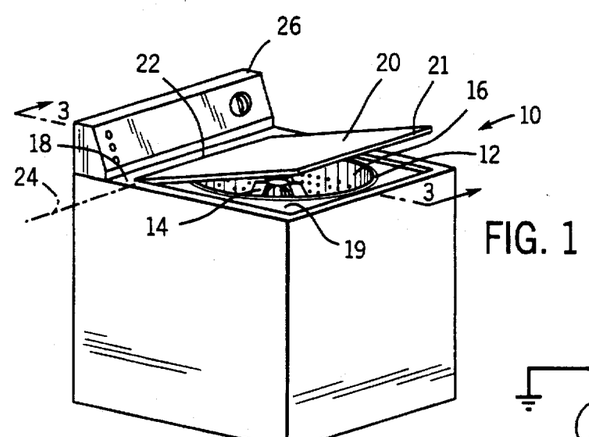
FIG. 1 is a perspective view of a top-loading residential washing machine with the lid opened to trigger a lid switch to turn off the washing machine motor.

Referring now to FIG. 1, a top-loading washing machine 10 includes a cylindrical tub 12 into which clothes may be placed to be washed. During a washing, the tub 12 is filled with water and the clothes are stirred by an agitator 14 driven by a motor (not shown) as is well understood in the art. After water has been drained from the tub 12, the same motor, during a spin cycle, rotates an inner spin basket 16 to remove excess water in the clothes through perforations in the outer wall of the spin basket 16. The motor is a high-amperage electrical device exhibiting rapid changes in current consumption based on its instantaneous loading.

Access to the tub 12 is provided through a circular opening in a generally planar and horizontal top 18. The circular opening conforms substantially to the opening of the spin basket 16. A square lid 20 may be closed to a horizontal position abutting the top 18 within a shallow recess 19 formed in the top 18. The lid 20 includes a downwardly extending lip 21 providing lid 20 with additional stiffness and a finished edge. The downwardly extending lip 21 at the center of the rear edge of the lid 20 provides a cam surface 22 for actuating a lid switch as will be described below.

The lid 20 may be opened by means of a hinge (not shown) rotating the rear edge of the lid about a hinge axis 24 along the rear edge of the lid 20. A console 26 supporting the controls of the washing machine 10 is positioned at the rear edge at the top 18 of the washing machine 10 behind the lid 20 when it is open.

Prior Art

Figure 2:
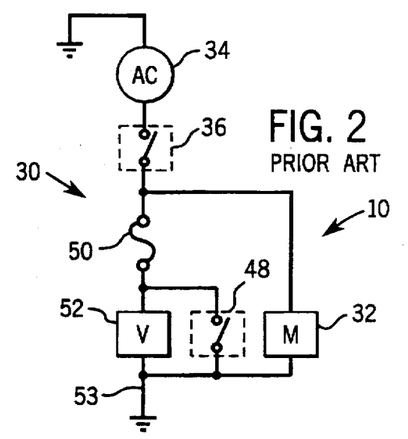
FIG. 2 is a simplified schematic diagram of a prior art lid switch, having a contact failure detection system which deactivates a low amperage water fill valve of the washing machine, but not the washing machine motor.
Figure 3:
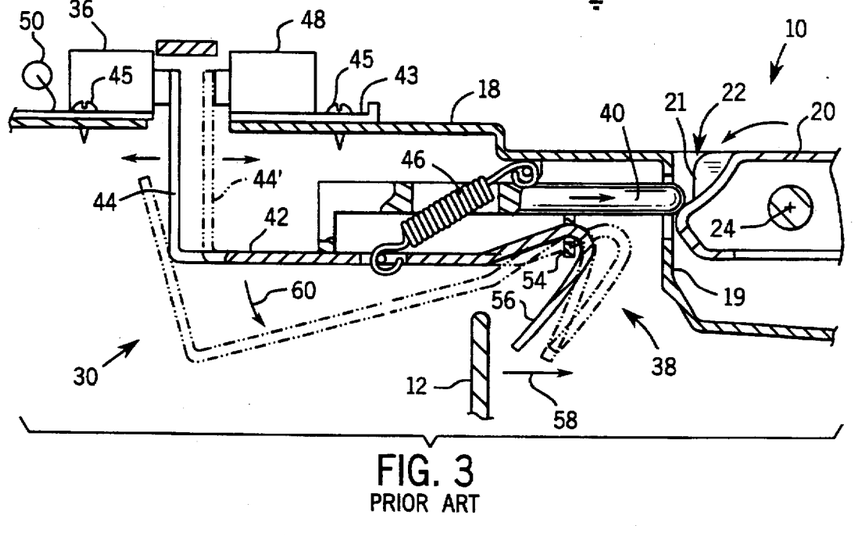
FIG. 3 is a detailed cross-section along line 3—3 of FIG. 1 showing the prior art lid switch of FIG. 2 employing two separate switch elements activated by a cam follower riding on a cam formed by the rear surface of the washing machine lid near the lid's hinge point.

Referring now to FIGS. 2 and 3, a prior art lid switch assembly 30 disconnects the motor 32 of the washing machine 10 from AC power 34 when the lid 20 is opened by more than a predetermined amount such as might allow access to the tub 12 while it is in motion. A first, normally-open switch 36 provides load contacts placed in series with the motor 32 (between the AC power 34 and the motor 32) so that when the contacts of switch 36 are open, the motor 32 is stopped. Switch 36 is activated by a cam follower assembly 38, which includes a rounded pin 40 extending through the rear vertical wall of the recess 19 to ride against the cam surface 22 of the lid 20. When the lid 20 is closed, the cam surface 22 is configured to push the pin 40 rearward in through the flange forming recess 19. A spring 46 biases the pin 40 toward the cam surface 22. This prior art of the cam follower is described generally in U.S. Pat. No. 3,569,646 issued Mar. 9, 1971, hereby incorporated by reference.

A pivoting metal arm 42 is attached to the pin 40 and includes an angled upward finger 44 extending through the top 18 of the washing machine 10. When the lid 20 is closed, the finger 44 pushes in the operator of the switch 36 to close its contacts allowing power to be received by the motor 32. Arm 42 and finger 44 are biased upward against the pin 40 by the same spring 46 which biases pin 40 toward the lid 20.

When lid 20 is raised by a small amount still preventing access to the tub 12, the cam surface 22 is configured to permit forward movement of the pin 40, the arm 42, and finger 44, releasing the operator of the switch 36 and breaking the circuit to the motor 32. Further opening of the lid 20 to a vertical position, causes additional forward movement of the pin 40 and finger 44 (to a position indicated by 44') until it compresses an operator of a second switch 48, opposing the operator of switch 36 causing the normally-open contacts of that switch 48 to close.

As shown in FIG. 2, contacts of switch 48 are placed in series with a fuse 50 and the series combination placed to shunt the motor 32. Further, the contacts of switch 48 alone shunt a valve 52 providing control of water to the tub 12. Normally, when the lid 20 is in the fully raised position and the contacts of switch 48 are closed, the contacts of switch 36 will be open and thus no current will flow through the series combination of the fuse 50 and the switch 48. On the other hand, if the contacts of switch 36 are welded closed, as may occur upon failure of switch 36, then when the lid 20 is fully opened and the contacts of switch 48 close, current flowing from the source of AC power 34 through the welded closed contacts of switch 36 through fuse 50 and closed contacts of switch 48 to ground will be sufficient to blow fuse 50. When fuse 50 blows, valve 52 will no longer operate signaling the user to call a service technician who will replace switch 36.

It should be noted, however, that the motor 32 is never disabled and thus, there may occur situations when the user is not prevented from opening the lid while the tub is rapidly rotating during the spin cycle. Generally, it is not practical to place fuse 50 in series with both the motor 32 and the valve 52 (for example, between AC power 34 and the switch 36) because the high peak demands of the motor 32 would require the fuse 50 to be extremely large and slow acting which would compromise the ability of current through switch 48 to reliably trip the fuse 50 without conducting dangerously high currents.

Generally other contacts are in series with both the motor 32 and valve 52 as controlled by the washing machine timer. These contacts are omitted for clarity in this and subsequent schematics.

Referring again to FIG. 3, the metal arm 42 is also pivotable about an eyelet 54 on the bottom of pin 40 so as to move finger 44 out from between the operators of switches 36 and 48, upon forward pressure on a downwardly extending hook 56 on the far side of finger 44 with respect to eyelet 54. This forward pressure may be applied when hook 56 is struck by the wall of the tub 12 when an out-of-balance condition causes motion of the tub 12 forward as indicated by arrow 58. When tub 12 presses against hook 56, the entire arm 42 is pivoted downward as indicated by arrow 60, removing it from contact with switch 36 and causing the motor 32 to be disconnected until the lid 20 is lifted to correct the out-of-balance condition by rearranging of the clothes within the tub 12, and the finger 44 is drawn back between the operators of switches 36 and 48.

Switches 36 and 48 are held on a carrier plate 43 attached to the top 18 by self-tapping screws 45 received by slots within the carrier plate 43 so that the assembly of switches 36 and 48 may be moved forward or backward so as to properly locate each switch 36 and 48 to be actuated with a predetermined opening and closing of the lid 20, as described above. This adjustment requires both the proper positioning of switch 36, to ensure that the washing machine 10 is deactivated with minor opening of the lid 20, and the proper positioning of switch 48 to ensure that the contacts of switch 36 are "tested" with complete opening of the lid 20. As has been noted, these additional adjustment steps during manufacturing increase the cost of the manufacturing process and carry with them the possibility of future misadjustment if screws 45 are loosened during use.

The Present Invention

Figure 4:
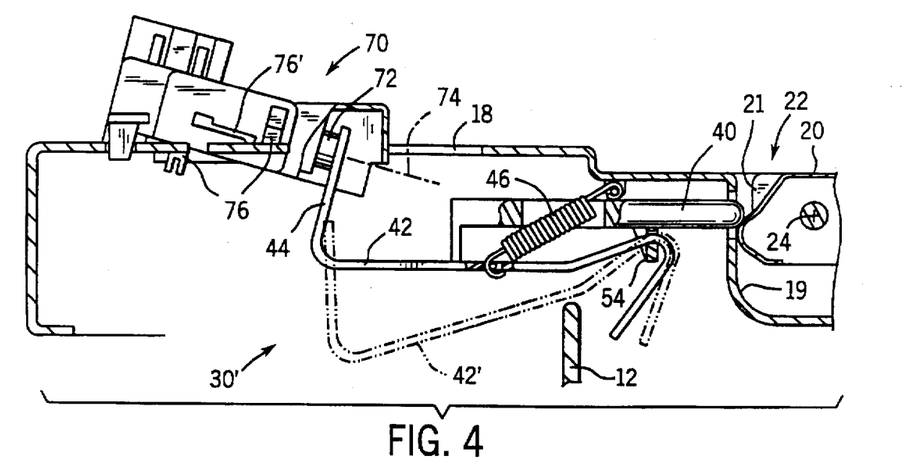
FIG. 4 is a figure similar to that of FIG. 3 showing the switch design of the present invention having a single switch operator.

Referring now to FIG. 4, the lid switch 70 of the present invention is also positioned on the upper surface of the top 18 of the washing machine 10 but employs a single operator 72 actuated by upwardly extending finger 44 of the metal arm 42. The operator 72 is compressed in a rearward direction as the lid 20 is closed and released in a forward direction as the lid 20 is opened.

The operator 72, rather than moving horizontally and parallel to the top 18, is tipped downward slightly to travel along an axis of movement 74 intersecting eyelet 54, the pivot point of the arm 42. Finger 44 is also bent slightly toward the tub 12 to lie along a tangent of a circle centered on eyelet 54. Thus, the finger 44 may disengage more easily from the operator 72 when it is pulled downward by an out-of-balance condition of the tub 12 (to a position indicated by dotted lines as arm 42').

In all other respects, the mechanism of the lid switch assembly 30' between the operator 72 and the lid 20 is substantially the same as that described above with respect to the prior art, with rounded pin 40 being biased toward the lid 20 by spring 46 and following cam surface 22 on the lid 20.

Figure 5:
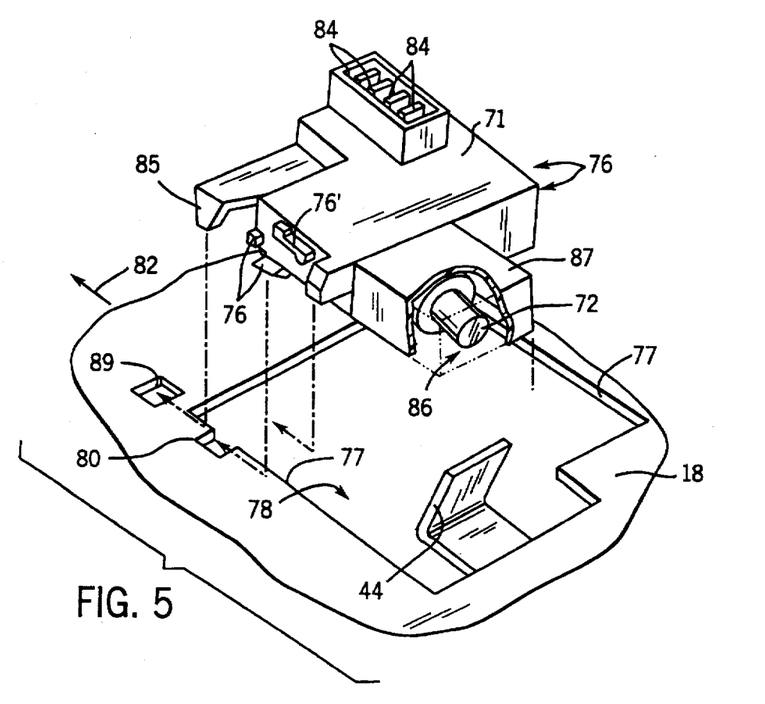
FIG. 5 is a perspective view of the switch of FIG. 4 in partial cut-away, showing the interfitting of the switch operator with the cam follower and the snapping into place of the housing of the lid switch against the housing of the washing machine.

Referring now also to FIG. 5, lid switch 70 is attached to top 18 by means of a series of laterally extending bosses 76 formed in the outer walls of the switch housing 71, the bosses 76 which together form a laterally extending channel which engages opposing edges 77 of an opening 78 cut in top 18. A notch 80 in one edge 77 permits a lower boss 76, forming a lower wall of the channel, to drop downward through the opening 78 during assembly. Subsequent rearward motion of the lid switch 70 (indicated by arrow 82) within the opening 78 then engages each of the bosses 76 with a top or bottom surface of an edge 77 of the opening 78, preventing vertical motion of the lid switch 70 with respect to the top 18.

Additional rearward motion of the lid switch 70, allows a downwardly flexing finger 85, extending outward from the housing 71, to drop into an index hole 89 locking the housing 71 against forward or backward motion. Horizontal play is reduced by the wedge shape of the finger 85 which thus fits snugly into the index hole 89. Vertical play is reduced by an upper flexible boss 76' which presses down against the top 18.

A set of four electrical terminals 84 extend from the upper surface of the lid switch 70, permitting a simple one connector attachment of electrical leads to the lid switch 70 as will be described below.

A protective shroud 87 extending from the switch housing 71 covers the operator 72 from the top, preventing wires or debris from above the top 18 from being caught between the operator 72 and the upward extending finger 44 during operation and facilitates seating once past the apex.

Figure 6:
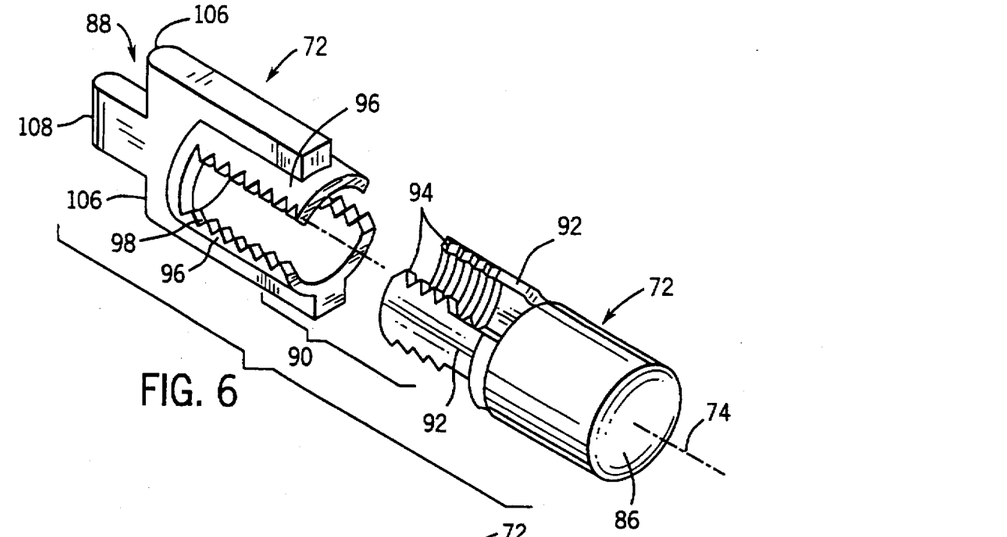
FIG. 6 is a perspective exploded view of a first embodiment of the operator of FIG. 5 showing interengaging teeth between the halves of the operator, such as allow the operator halves to slip toward each other in self-adjustment.

Referring now to FIG. 6, one half 86 of the operator 72 is exposed under the shroud 87 to contact the finger 44. An opposite, rearward half 88 of the operator 72 is joined to half 86 by means of a collapsible joint 90 providing for an adjustment of the length of the operator 72 along its axis of movement 74.

In a first embodiment, a compressive force along axis 74 between the first and second halves 86 and 88 and exceeding a predetermined threshold will cause the halves 88 and 86 of the operator 72 will telescope inward toward each other. As will be described below, this adjustment in length of the operator 72 permits the amount that the lid 20 may be opened before activating lid switch 70 to be automatically set.

The collapsible joint 90 providing this telescoping motion in the operator 72 is composed of interdigitating axially-extending fingers 92 and 96 attached to the first and second halves 86 and 88, respectively. The fingers 92 are horizontally opposed 90° sectors of a cylindrical tube and have circumferentially extending teeth 94 at their extreme ends starting approximately half-way along the length of the fingers.

Fingers 96 are also opposed 90° sectors of a cylinder, but the vertically opposed sectors rather than the horizontally opposed sectors of fingers 92 so that the fingers 96 and 92 slide between each other to form a single tubular cylinder during assembly. Circumferentially extending teeth 98 are also cut in the edges of the fingers 96, but in this case, along the full length of the fingers 96.

When the halves 86 and 88 of the operator 72 are assembled together, teeth 98 and 94 engage each other to resist further relative motion of the halves 86 and 88. A predetermined threshold compressive force along axis 74, however, will cause fingers 92 to flex radially outward to disengage teeth 94 from teeth 98 allowing the first and second halves 86 and 88 of the operator 72 to move closer together as indicated by arrows 100. The threshold compressive force compressive force is set to be greater than that necessary to actuate the lid switch 70, accordingly, the ends of the operator 72 move together only after the lid switch 70 has been actuated and when the motion of the operator 72 is stopped by a mechanical stop within the lid switch 70 as will be described.

Operator 72 may be manufactured out of an insulating material such as an injection-molded thermal plastic.

Figure 7:
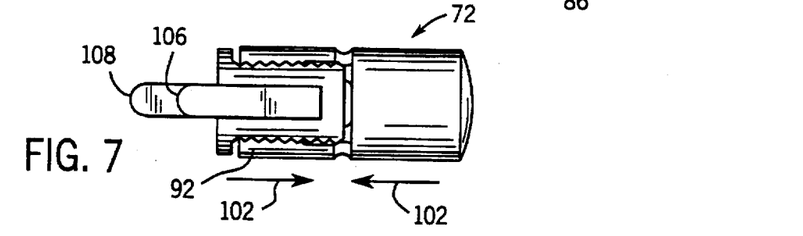
FIGS. 7 and 8 are two plan views of the switch operator of FIG. 6, showing the operator in adjusted and first installed positions, respectively.
Figure 8:
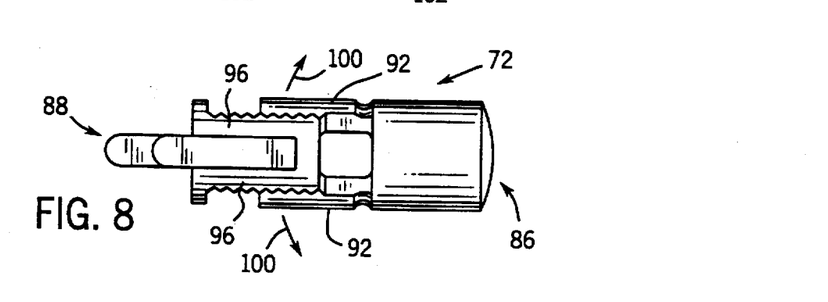

Referring now to FIG. 8, when the lid switch 70 and the operator 72 are first installed in the washing machine 10, the operator 72 is set to have a relatively large separation between its halves 86 and 88. Referring to FIG. 7, after the first closing of the lid 20, and upon application of a force greater than the threshold compressive force, the ends of the operator 72 move together as indicated by arrows 102.

Figure 9:
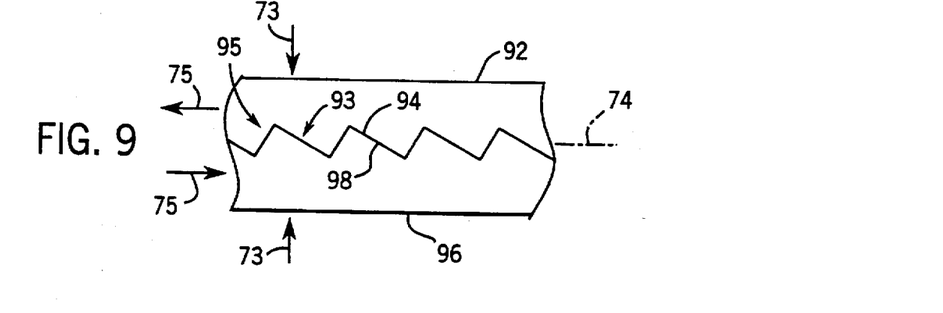
FIG. 9 is a detailed view of the teeth of the operator of FIGS. 6 through 8, showing an asymmetry which permits control of tooth skipping during the adjustment process.

Referring now to FIG. 9, the teeth 94 and 98, at the mating surfaces of fingers 92 and 96, have a sawtooth profile in which leading faces 93 of each tooth have a low slope with respect to the axis 74, and trailing faces 95 have a high slope with respect to the axis 74. This sawtooth shape of the teeth 94 is intended to reduce the skipping of teeth 94, and thus to prevent over adjustment of the operator 72 when the operator 72 is compressed, and improve the engagement of the teeth during normal operation.

During a slipping of half 86 of the operator 72 with respect to half 88, the leading faces 93 of the teeth press against each other. Their slope determines the relationship between the restoring force 73 perpendicular to axis 74 which serves to hold the teeth against such slippage and the threshold compressive force 75 along axis 74 necessary to cause the teeth 94 to slip with respect to each other. In the present invention, the use of shallow leading faces 93 allow a greater restoring force 73 to be applied against the teeth 94 and 98 without increasing the threshold compressive force 75. This greater restoring force 73 reduces the possibility of a skipping of teeth when the operator 72 is adjusted in length during the first closing of the lid. The greater restoring force 73 also improves the engagement of the teeth when the operator is in normal use.

The shallow slope of the leading faces 93 also strengthens the teeth 94 against deformation or fracture during operation.

In order to preserve a desired pitch of the teeth 94 and 98, and hence the resolution of the adjustment of the length of the operator 72, faces 95 are made steeper as faces 93 are made shallower. The restoring force 73 is provided by the curved shape of the fingers 92 and the elasticity of the plastic out of which they are constructed.

It should be noted that the potential for skipping of teeth may be exacerbated by a spring force outward on the operator 72 caused by an internal spring of the lid switch 70 as will be described.

In the previously described embodiment of FIGS. 6 through 8, shortening of the operator 72 occurs when a predetermined threshold compressive force 75 is exceeded. Critical to the function of operator 72 is that it shortens when the threshold compressive force 75 is exceeded, but stops shortening when compressive forces drop again to less than the threshold compressive force 75.

Variations on the construction of this operator 72 can provide the same function. The teeth 94, for example, may be replaced with frictional surfaces selected to have dynamic friction sufficient to actuate the lid switch 70 (as will be discussed below)and static friction low enough to allow slippage of the halves 86 and 88 when the switch has been actuated and a hard stop has been reached.

Alternatively, the halves 86 and 88 of the operator 72 may be held in separation by a crushable material or a deformable element. The crushable material may be a metallic mesh formed into a cylinder, similar to the configuration used in collapsible steering columns in automobiles, or a glass foam or the like. One implementation of a deformable element provides that one half 86 or 88 of the operator 72 carry a ball or knife which rakes past a deformable material in the second half of the operator 72 so as to deform that material as the operator halves are compressed.

A successive shearing of a set of shear pins joining the halves 86 and 88 of the operator 72, or their equivalent, may be used to the same effect.

Figure 16:
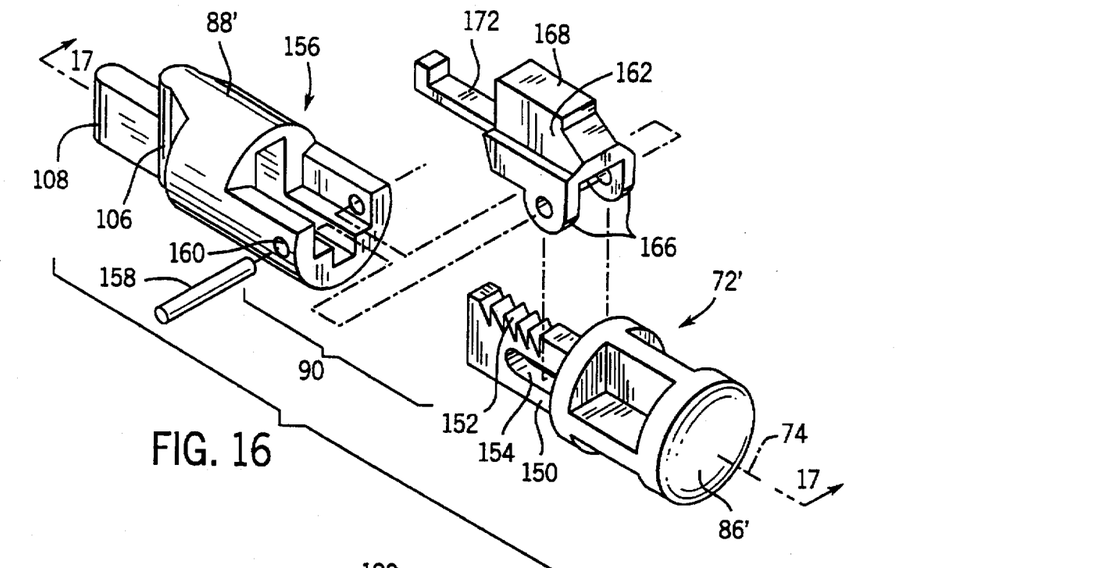
FIG. 16 is a figure similar to that of FIG. 6 showing a second embodiment of the operator of the present invention which slips not in response to a predetermined threshold compressive force but in response to a predetermined amount of travel.

Referring now to FIG. 16 in a different embodiment of the operator 72' operator halves 86' and 88' move together not in response to a threshold compressive force but in response to a predetermined travel of the operator 72 along axis 74.

In this embodiment, half 86' of the operator 72' (exposed under the shroud 87 to contact the finger 44 shown in FIG. 5) includes an inwardly extending rack 150 having teeth 152 along its upper edge. The teeth 152 have substantially vertically extending rear faces so as to form half of a ratchet to be described. A slot 154 extending along axis 74 is cut laterally through the rack 150.

The rack 150 has a generally rectangular cross-section which is received by a corresponding rectangular bore 156 extending into half 88' along axis 74. Thus halves 86' and 88' may move together and apart along axis 74 with rack 150 sliding within bore 156. A pin 158 passes laterally through holes 160 opposed laterally across the bore 156 in the half 88'. The pin 158 proceeds through the slot 154 in the rack 150 and is retained by the walls of bore 156. The slot 154 allows free motion of the rack 150 within bore 156.

Figure 17:
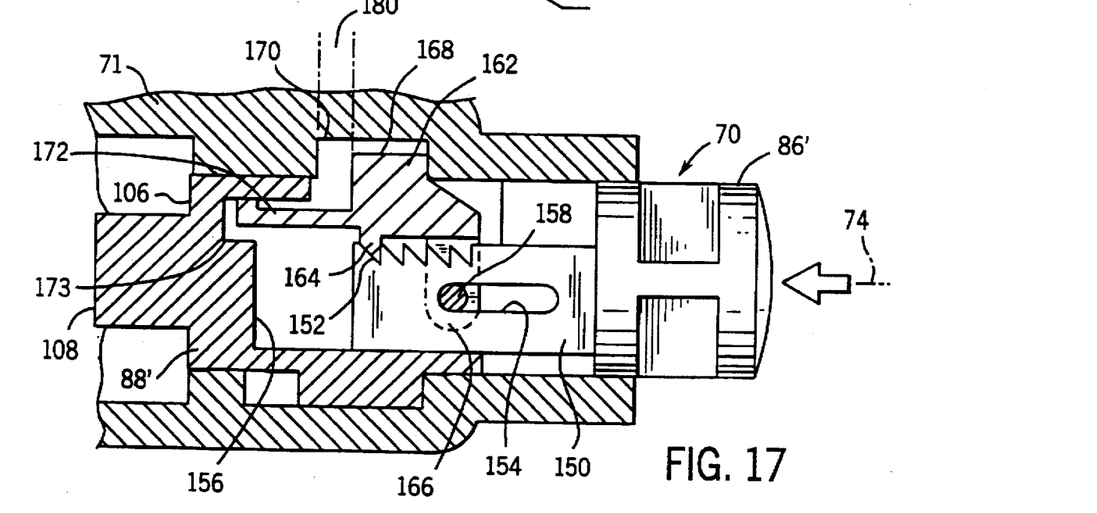
FIG. 17 is a cross-sectional unexploded elevational view of the operator of FIG. 16 taken along line 17—17 of FIG. 16 showing the operator in its extended position in its first installed position with a pawl engaging a rack on a first end of the operator.

Referring now also to FIG. 17, a pawl 162 has a tooth 164 engaging the teeth 152 of the rack 150, the teeth 152 and pawl 162 together to provide a ratchet. The pawl 162 pivots about the pin 158 which is held by eye bars 166 extending downwardly from the pawl 162 to flank the rack 150. The pivot point of the pawl 162 is forward along axis 74 with respect to the tooth 164.

Extending upward from the pawl 162 is a post 168. When the operator 72' is placed in the housing 71 of the lid switch 70, the post 168 is received within a short slot 170 in the housing 71. A cantilevered spring arm 172 attached to rear side of the pawl extends rearward and is received by a pocket 173 within the second end 88' at the rear of bore 156. The spring arm 172 interfitting with the pocket 173 serves to bias the pawl 162 downward about a pivot point around pin 158 to engage tooth 164 with teeth 152 absent other forces on the pawl 162.

Figure 18:
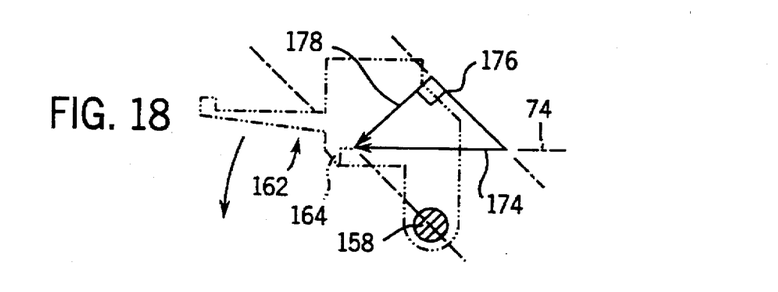
FIG. 18 is a vector force diagram showing the forces exerted on the pawl of FIG. 17 serving to rotate it into engagement with the rack of FIG. 17.

Referring now to FIGS. 17 and 18, rearward force on the first half 86' of the operator 72 causes at least one of the teeth 152 of the rack 150 to press rearward on the tooth 164 of the pawl 162. This inward force 174 directed generally along axis 74 may be decomposed into a radial force vector 176 (directed along a line of radius from the pivot point of pin 158 and tooth 164 against which the force 174 is exerted) and a tangential force 178 which serves to rotate the pawl 162 downward into further engagement with the teeth 152 of the first half 86'. Thus during initial rearward pressure on the operator 72, the tooth 164 and teeth 152 are biased into engagement.

Figure 19:
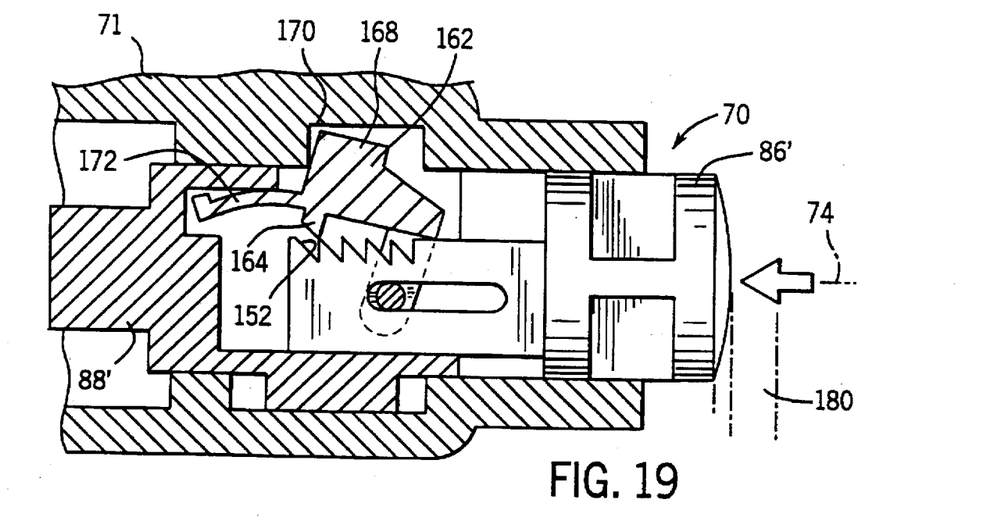
FIG. 19 is a figure similar to that of FIG. 17 showing disengagement of the pawl and rack after a predetermined travel of the operator allowing adjustment of the operator length.
Figure 20:
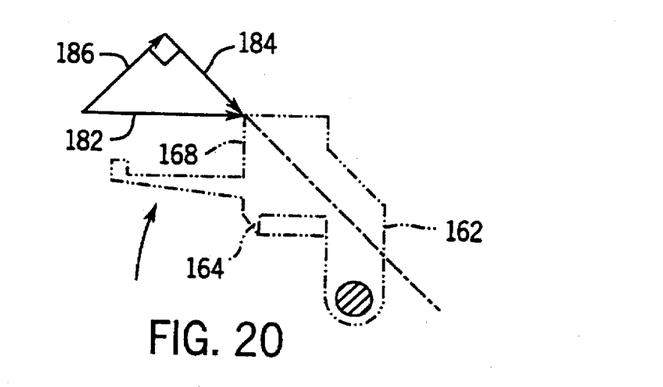
FIG. 20 is a vector force diagram similar to that of FIG. 18 showing the force on the pawl which serves to disengage it from the rack.

Referring now to FIG. 19, with further rearward movement of the operator 72' along axis 74, post 168 moves within slot 170 until the end of slot 170 is reached at a predetermined travel distance 180. When the end of slot 170 is reached, post 168 strikes a rearward edge of the slot 170 which exerts a forward force on the post 168. Referring to FIG. 20 the force of the abutment 182 between the slot 170 and post 168 may again be decomposed into a radial vector component 184 and a tangential vector component 186 the latter of which serves to raise the pawl 162 disengaging the tooth 164 from teeth 152.

This disengagement of teeth 164 and 152 permits a moving together of halves 86' and 88' until the force 182 against the post 168 decreases sufficiently to allow the pawl 162 to move downward again re-engaging tooth 164 with one of teeth 152 under the biasing influence of arm 172.

Thus the halves 86' and 88' move inward only if the operator 72' has traveled more than a predetermined distance 180 independently of the magnitude of forces exerted on the outer end of the operator 72'.

At the furthest rearward travel of the halves 88', dictated by the abutment of post 168 and slot 170, the lid switch 70 is actuated. Accordingly as the halves 88' and 86' are collapsed together with a first closing of the lid 20 of the washing machine 10, it may be ensured that the amount that the lid 20 must be raised to deactivate the switch has been minimized.

Figure 10:
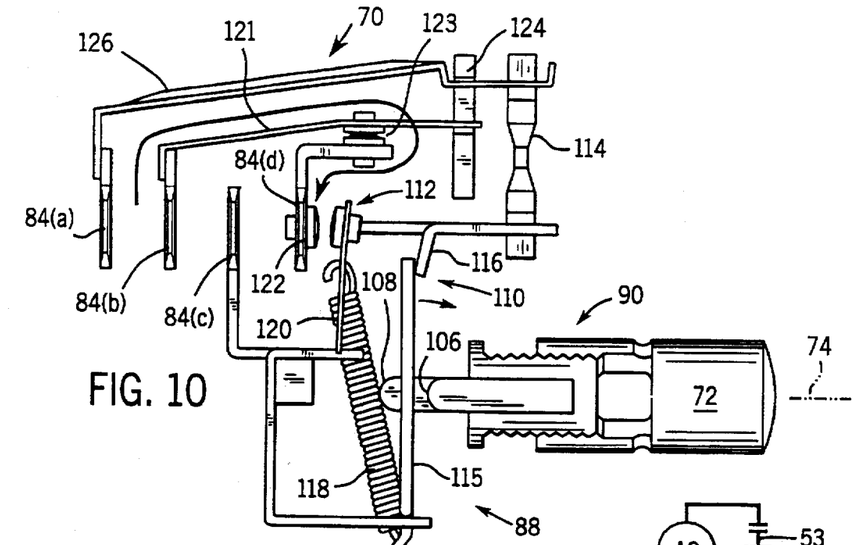
FIG. 10 is a simplified plan view of the inner mechanism of switch of FIG. 5, together with the operator of FIG. 6, showing a first position prior to a first lid closure.
Figures 11, 12:
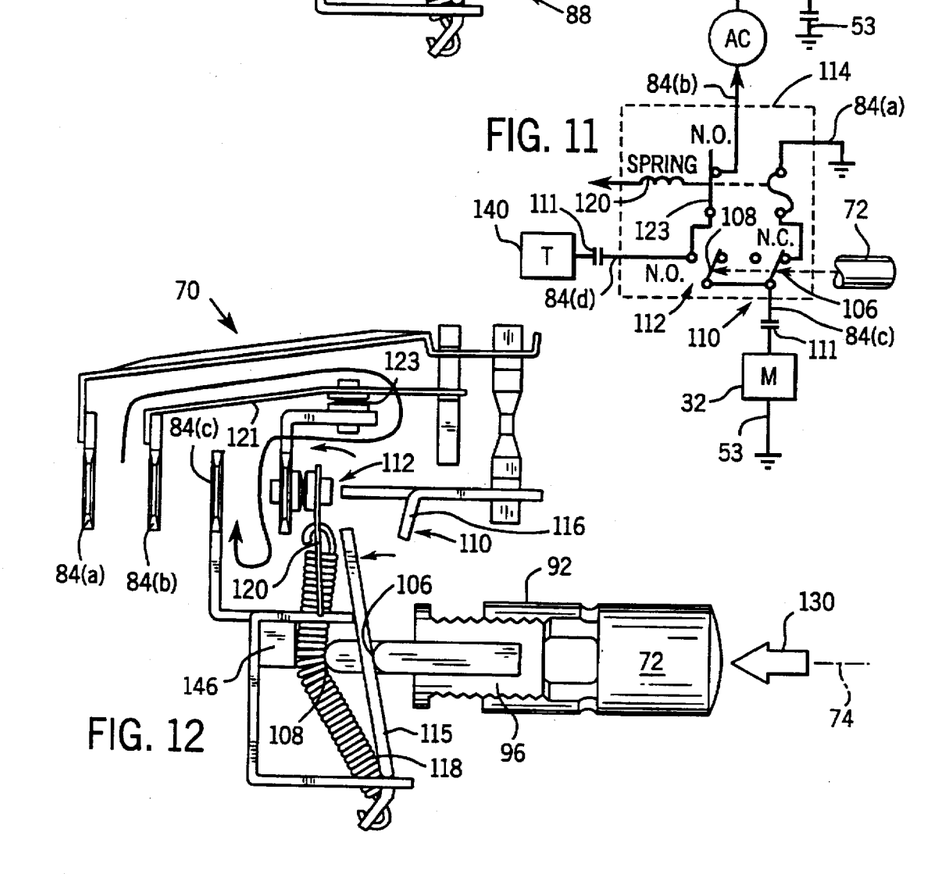
FIG. 11 is a simplified schematic representation of the electrical circuit of the switch of FIG. 10, showing two contacts mechanically connected to the operator of FIG. 6 and one contact mechanically connected to a fusible link.
FIG. 12 is a figure similar to that of FIG. 10, showing the switch in a second position upon which current is conducted through switch terminals to the washing machine motor.

Referring now to FIGS. 10 and 11, together with FIGS. 6, 7, and 8, the inner half 88 of the operator 72' includes a first and second shoulder 106 and 108. Shoulder 106 extends inward into the lid switch 70, along axis 74, by a lesser distance than shoulder 108. As shown in FIG. 11, shoulders 106 and 108 activate an auxiliary contact set 110 and load contact set 112, respectively. Auxiliary contact set 110 is normally closed and load contact set 112 is normally open. When the operator 72 moves inward along axis 74, auxiliary contact set 110 is opened and load contact set 112 is closed. The difference in height between shoulders 106 and 108 is such as when the operator 72 travels again outward along axis 74, load contact set 112 opens before auxiliary contact set 110 closes. It will be understood that this requirement that load contact set 112 opens before auxiliary contact set 110 closes can be met by a range of different heights between shoulders 106 and 108 and thus, the precise difference between shoulders 106 and 108 is relatively uncritical.

Auxiliary contact set 110 is formed by conductive lever 115 spring biased against stationary contact 116 by helical tension spring 118. When operator 72 moves inward/rearward along axis 74, shoulder 106 pushes lever 115 away from stationary contact 116.

The same spring 118 biases a lever 120 of the load contact set 112 outward away from a stationary contact 122. Load contact set is intended to break current flowing to the motor 32. For this reason, the free end of the lever 120 opposite stationary contact 122 include a rivet of contact material identical to that of stationary contact 122 and intended to reduce contact erosion during the interruption of high motor currents by the load contact set 112.

The various components of the lid switch 70 of FIG. 10 are contained within an insulating housing shown generally in FIG. 5 according to methods well understood in the art.

In FIG. 10, the lid switch 70 is in a position commensurate with the lid 20 being open. AC power is applied to a terminal 84(b) and is conducted along a leaf spring 121 to disconnect contact set 123. Disconnect contact set 123 has one contact of which is attached to the leaf spring 121 and the other contact of which is attached to the same conductive support holding stationary contact 122. The contacts of disconnect contact set 123 are held closed against the biasing of leaf spring 121 by an insulating spacer 124, having a first aperture gripping an end of the leaf spring 121 and a second aperture gripping a 10 second leaf spring 126 positioned above the first leaf spring 121. Spacer 124 is received in slots in the housing of lid switch 70 (not shown) which limit it to vertical sliding movement.

The second leaf spring 126 is connected to ground via terminal 84(a).

The second leaf spring 126 is held against it's natural upward bias (which would tend to assist in the opening contact set 122), by a fusible link 114 which anchors the end of spring 126 downward to the same stationary support that supports the stationary contact 116 of auxiliary contact set 110.

Thus, prior to the closing of the lid, AC power entering terminal 84(b) flows through disconnect contact set 123 to stationary contact 122 and no further because load contact set 112 is open.

Referring now to FIG. 12, when the operator 72 is pushed inward along axis 74 as indicated by arrow 130, shoulder 106 first pushes against lever 115 opening auxiliary contact set 110. Next, shoulder 108 pushes against spring 118 closing load contact set 112. Current now flows from terminal 84(b) through disconnect contact set 123 and through load contact set 112 and out of terminal 84(c) which is connected to the washing machine motor 32. The washing machine may now operate as governed by its console controls and for this purpose console control contact set 111 may be positioned between terminal 84(c) and the washing machine motor 32.

Terminal 84(c) also connects electrically to lever 115; however, the contact from lever 115 to stationary contact 116 has been broken and so there is no further electrical path.

Figure 13:
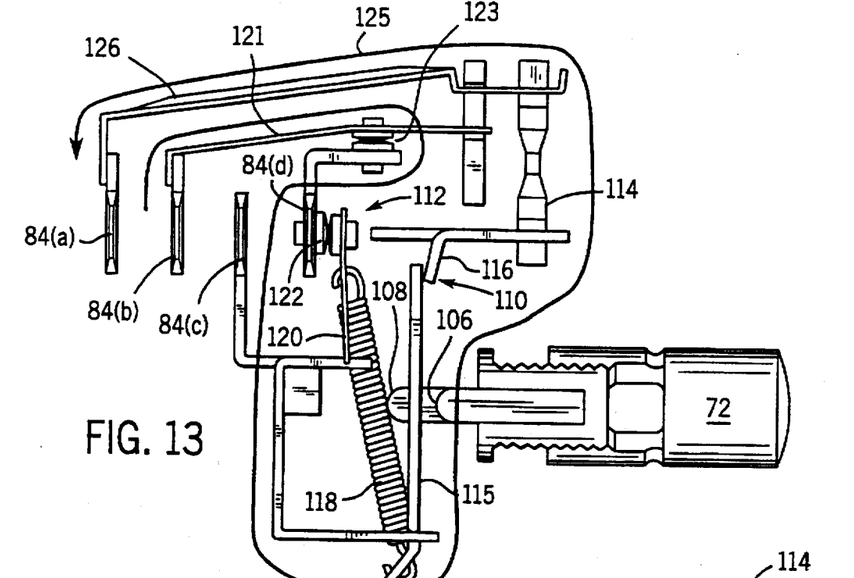
FIG. 13 is a figure similar to that of FIGS. 10 and 12, showing the switch in its first position when the primary contacts are welded shut as would occur during contact failure and showing a current path through a fusible link.

Referring now to FIG. 13, if load contact set 112 has welded closed causing lever 120 to remain connected to the stationary contact 122, after the operator 72 has returned to its outward position, caused by an opening of the lid 20, load contact set 112 remains closed when auxiliary contact set 110 is closed. Now, there is a current path from terminal 84(b), the source of AC power, through disconnect contact set 123, welded load contact set 112, closed auxiliary contact set 110, fusible link 114, and leaf spring 126 to terminal 84(a). Although this short circuit from AC power to ground is shunted by motor 32 as shown in FIG. 11, sufficient current flows through this path to heat and melt the fusible link 114.

Figures 14, 15:
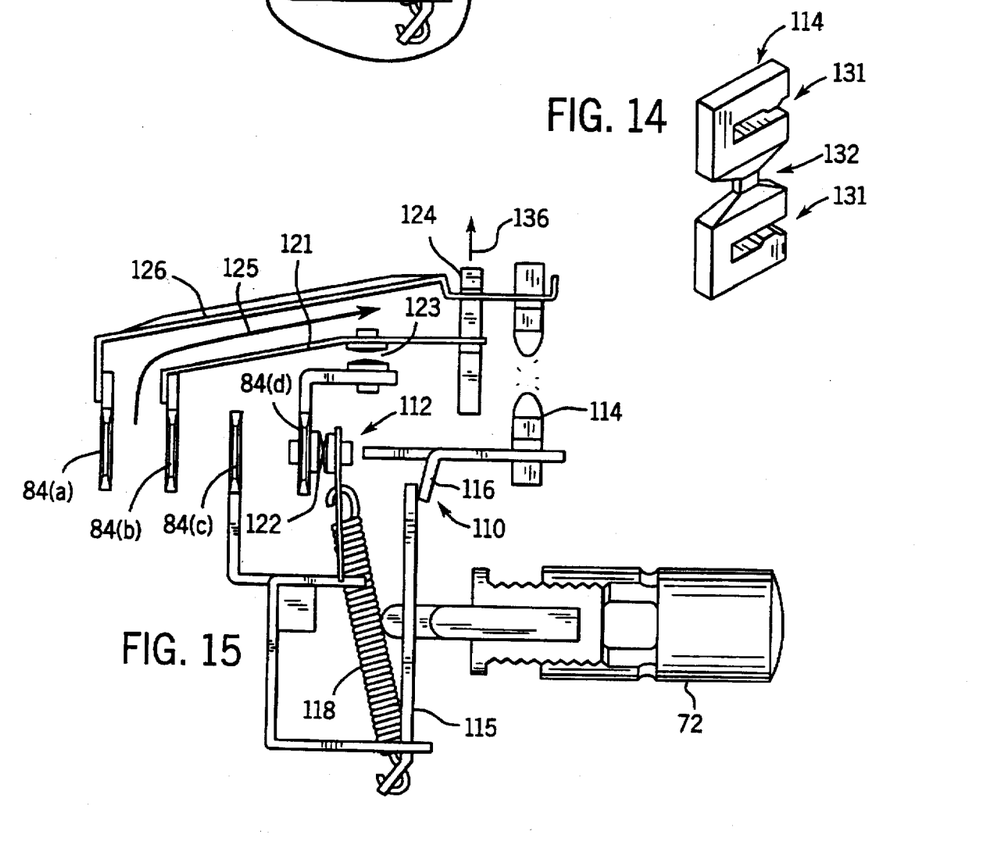
FIG. 14 is a perspective view of the fusible link of FIG. 13.
FIG. 15 is a figure similar to that of FIG. 13, showing a breaking of the fusible link of FIGS. 13 and 14, and a disconnection of the load by opening of disconnect contacts.

Referring now also to FIG. 14, the fusible link 114 has a first and second hook end 131 allowing the fusible link to be hooked on to the support for stationary contact 116 at one end, and at the other end to leaf spring 126. The hooked ends 131 are separated by a narrow waist section 132 of lesser cross-sectional area which permits accurate control of the total resistance of the fusible link 114. The waist 132 also concentrates the dissipated heat from the current passed by the fusible link 114 in a small area causing that area to predictably melt prior to other portions of the fusible link 114. In the preferred embodiment, the fusible link is manufactured from a carbon impregnated thermoplastic and adjusted to have a resistance of approximately 400 Ohms. Accordingly, the fusible link draws much less than one ampere before it breaks far less current than required by the motor.

It should be noted that the exact current limit of the fusible link 114 is not critical because the fusible link 114 is not normally in the circuit during operation of the washing machine 10. The fusible link therefore may blow at some safe current far below that which might damage the wiring or trip the circuit breakers.

Referring now to FIG. 15, upon blowing of the fusible link 114, leaf springs 126 and 121 are free to move in tandem upward together as indicated by arrow 136 and as joined by insulating spacer 124. This separates the contacts of disconnect contact set 123, breaking the current path 125 so that the AC source at terminal 84(b) is no longer connected to terminal 84(c), whether or not the operator 72 is pushed inward.

The power is also disconnected from terminal 84(d) associated with the stationary contact 122 of load contact set 112. Terminal 84(d) thus disconnects power to other elements of the washing machine such as valves and timers 140 that may require power even when the lid is open and thus cannot be connected to terminal 84(c). A console control contact set 111 may be placed in series between terminal 84(c) and these other elements.

The net effect, however, is that when load contact set 112 fails, the washing machine 10 including the motor 32 is fully deactivated. It will not be unexpected for fusible link 114 to blow during the spin cycle of the washing machine, if the lid is opened at this time. Fully deactivating the washing machine motor will thus protect the user from injury if the lid were to again be opened during the same spin cycle.

Referring momentarily to FIG. 12, the first time the lid is closed, the operator 72 moves inward along axis 74 as shown by arrow 130 until shoulder 108 pressing against spring 118 is stopped by an insulating stop 146. Alternatively, inward motion of the operator 72 may be stopped by a separate stop (not shown) in the form of a key extending outward from half 88 into a channel of fixed length.

Further pressure on operator 72 by the cam surface 22 of the lid is accommodated by slipping of the fingers 92 with respect to the fingers 96. This slipping essentially adjusts the lid switch 70 so that it is just activated when the lid is fully closed. Thus, any opening of the lid 20 begins outward movement of the operator 72, resulting in a predictably small opening of the lid 20 deactivating the lid switch 70 regardless of the initial separation between lid switch 70 and the cam surface 22 of the lid 20 or an accumulated tolerances in the elements of the pin 40 and arm 42. Given the small angle of opening of lid 20 that must deactivate the lid switch 70, this self-adjusting feature is critical to the ability to snap the lid switch 70 into the top 18 without further adjustment during the manufacturing process.

The above description has been that of a preferred embodiment of the invention. It will occur to those that practice the art that many modifications may be made without departing from the spirit and scope of the invention. In order to apprise the public of the various embodiments that may fall within the scope of the invention, the following claims are made.

We claim:

1. A switch assembly controlling current to a load with contact failure detection comprising:

a) an operator movable between a first and second position;

b) a load contact pair, during normal operation, permitting current flow to the load only when the operator is in the second position, and during failure permitting current flow in the first position;

c) an auxiliary contact pair shunting the load when the operator is in the first position;

d) a fusible link in series with the auxiliary contact pair; and e) a disconnect contact pair in series with the load contact pair and held closed by the fusible link only when the fusible link is not broken;

whereby a failure of the load contact pair causes current flow through the fusible link when the operator is in the first position, breaking the fusible link and opening the disconnect contact pair.

2. The switch assembly of claim 1 wherein the fusible link is not in series with the load.

3. The switch assembly of claim 1 wherein the fusible link breaks at a current of less than 2 amperes.

4. The switch assembly of claim 1 including an auxiliary terminal connected to the side of the disconnect contact pair toward the load, wherein opening of the disconnect contact pair disconnects the auxiliary terminal from current.

5. The switch assembly of claim 1 wherein the fusible link is an electrically conductive polymer.

6. A switch assembly for a washing machine or the like incorporating an electrical load and having a lid hinged about a hinge axis at one edge to open and close between a closed position with the lid substantially aligned with the top surface of the washing machine, and an opened position where an edge of the lid opposite the hinged edge is raised with respect to its position when the lid is closed, the switch assembly comprising:

a) an operator moving to a first position when the lid is in the open position and second position when the lid is in the closed position;

b) a load contact pair permitting current flow to the load only when the operator is in the second position, during normal operation of the load contacts, and permitting current flow in the first position during failure of the load contacts;

c) an auxiliary contact pair shunting the load when the operator is in the first position;

d) a fusible link in series with the auxiliary contact pair;

e) a disconnect contact pair in series with the load contact pair and held closed by the fusible link only when the fusible link is not broken;

whereby a failure of the load contact pair causes current flow through the fusible link when the operator is in the first position, breaking the fusible link and opening the disconnect contact pair.

7. The switch assembly of claim 6 wherein the disconnect contact pair is in series with an entire electrical load of the washing machine.

8. The switch assembly of claim 6 including an auxiliary terminal connected to a washing machine control and to a side of the load contact pair away from the electrical load, wherein opening of the disconnect contact pair disconnects the auxiliary terminal from current.

9. The switch assembly of claim 6 wherein the operator includes a collapsible portion; and whereby a first closing of the lid causes collapsing of the collapsible portion after the operator reaches the second position; and whereby the opening of the lid after the first closing causes the operator to return to the first position before the lid has opened by a predetermined amount.

10. The switch assembly of claim 9 wherein the collapsible portion is a first and second sliding shell having interengaging teeth flexing out of engagement with the predetermined compressive force on the operator.

11. The switch assembly of claim 9 wherein the collapsible portion is a first and second sliding shell each supporting one of ratchet teeth and a pawl, the pawl including a pylon abutting a stop to disengage the pawl from the ratchet teeth when the operator has moved a predetermined threshold distance.

12. The switch assembly of claim 6 wherein the fusible link is a conductive polymer.

13. The switch assembly of claim 6 wherein the fusible link is not in series with the load.

14. The switch assembly of claim 6 wherein the lid is supported by a washing machine housing and wherein the housing and the switch assembly have mating snap fittings so that the switch assembly may be snapped in place to the housing without adjustment.

15. The switch assembly of claim 14 wherein the snap fitting on the washing machine housing is a slot and hole and wherein the snap fitting on the switch assembly is a set of channels supported by the slot and a spring loaded detent received by the hole.

16. The switch assembly of claim 6 wherein the lid is supported by a washing machine housing and wherein the switch assembly includes lateral channels receiving edges of a hole in a sheet metal top of the washing machine housing and wherein the channels include a flexible member adapting the width of the channel to variations in the thickness of the sheet metal.

17. A switch assembly for a top-loading washing machine or the like having a lid hinged about a hinge axis at one edge to open and close between a closed position with the lid substantially aligned with the top surface of the washing machine, and a switch off position where an edge of the lid opposite the hinged edge is raised with respect to its position when the lid is closed, the switch assembly comprising:

a) an electric switch having contacts and an operator, the operator moving in a first direction to actuate the contacts at a switch actuation point and moving in a second direction to de-actuate the contacts at a de-actuation point; and b) a collapsible joint having a first and second end moving with respect to each other only after the operator has reached the switch actuation point, the first end connected with the lid to move with opening and closing of the lid and the second end connected with the switch operator to move the switch operator in the first direction with closing of the lid and to move in the second direction with opening of the lid;

whereby a first closing of the lid causes collapse of the collapsible joint after the switch operator reaches the switch actuation point; and whereby the opening of the lid after the first closing causes the operator to move in the second direction past the de-actuation point before the lid has opened by a predetermined amount.

18. The switch assembly of claim 17 wherein the collapsible joint comprises:

a first and second sliding shell attached to the first and second ends respectively and having interengaging teeth flexing out of engagement with the predetermined compressive force on the first and second ends.

19. The switch assembly of claim 17 wherein the collapsible joint comprises a first and second sliding shell each supporting one of ratchet teeth and pawl, the pawl including a pylon abutting a stop to disengage the pawl from the ratchet teeth when the operator has moved a predetermined threshold distance.

20. The switch assembly of claim 17 wherein the collapsible joint comprises a first and second sliding shell held in separation by a deformable element.

21. The switch assembly of claim 17 wherein the collapsible joint comprises a first and second sliding shell held in separation by a crushable material.

* * * * *

UNITED STATES PATENT AND TRADEMARK OFFICE
CERTIFICATE OF CORRECTION

PATENT NO. : 5,682,772
DATED : November 4, 1997
INVENTOR(S) : Kenyon A. Hapke et al.

It is certified that error appears in the above-identified patent and that said Letters Patent is hereby corrected as shown below:

Title page, item [22] filing date should read --February 22, 1996.

Col. 7, line 45-46 "compressive force compressive force" should be
--compressive force--

Signed and Sealed this

Seventeenth Day of March, 1998

Attest:

BRUCE LEHMAN

Attesting Officer

Commissioner of Patents and Trademarks